April 1, 1958 — R. H. PECKHAM — 2,828,669
LENS SYSTEM FOR ENDOSCOPES
Filed July 14, 1953 — 2 Sheets-Sheet 2

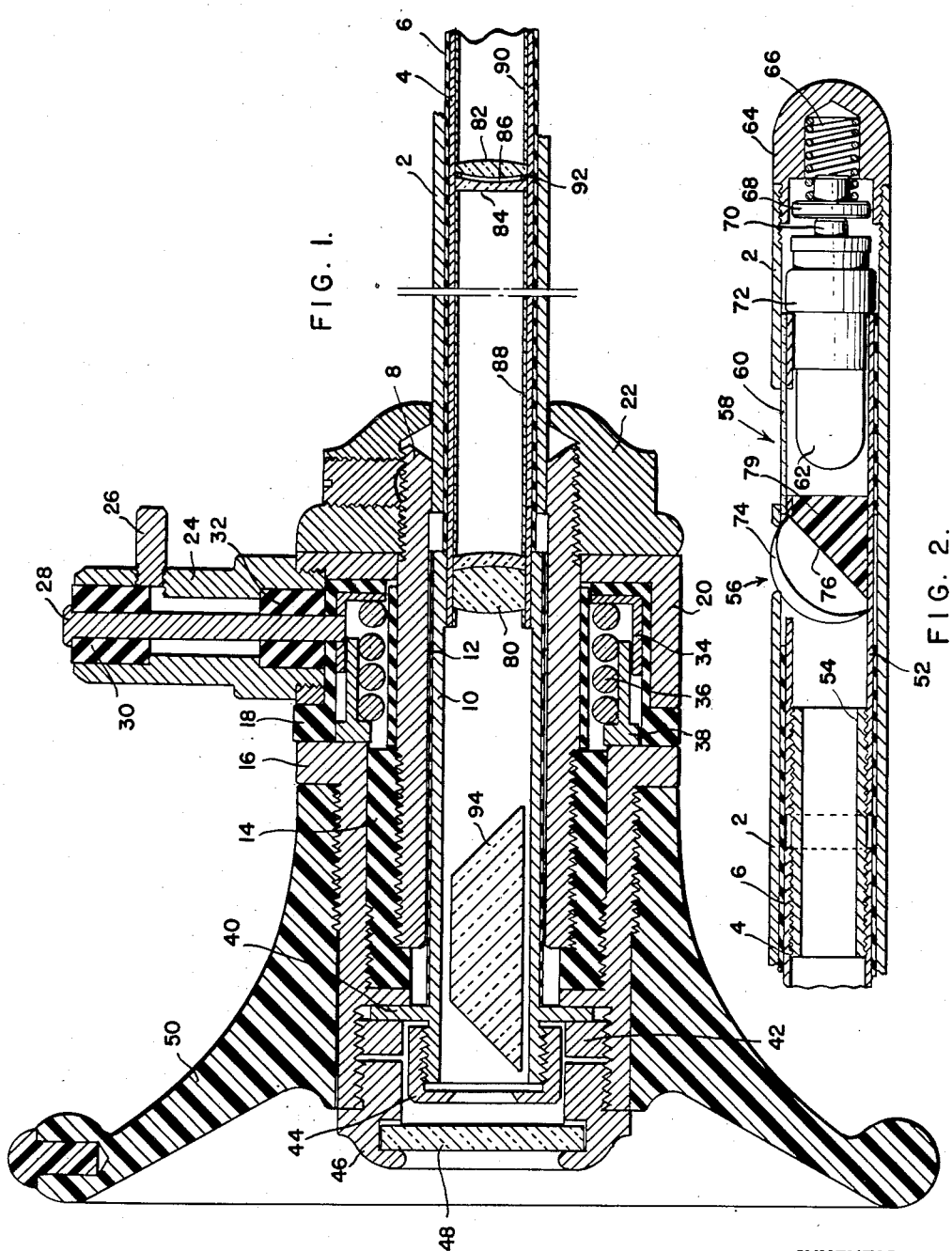

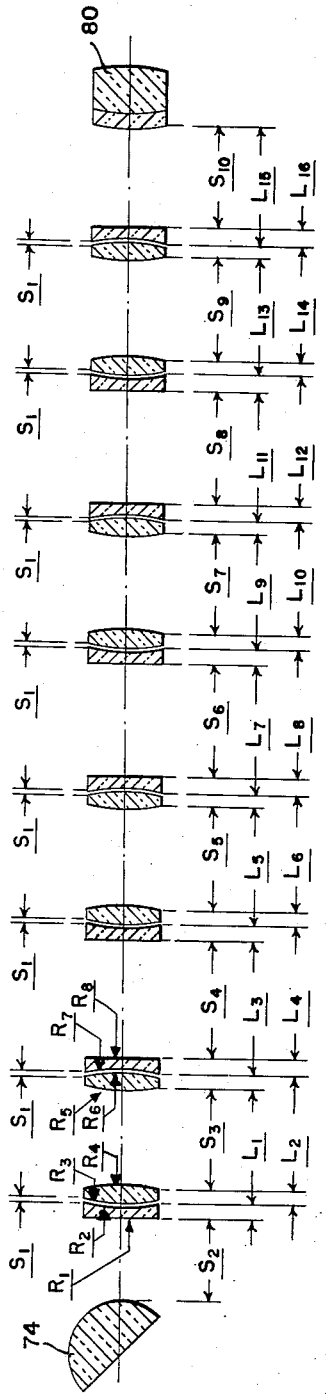

FIG. 3

SPACER LENGTHS

| SPACER | LENGTH |
|---|---|
| $S_1$ | 0.005 |
| $S_2$ | 1.496921 |
| $S_3$ | 3.045136 |
| $S_4$ | 2.950600 |
| $S_5$ | 3.045136 |
| $S_6$ | 2.950600 |
| $S_7$ | 3.045136 |
| $S_8$ | 2.950600 |
| $S_9$ | 3.045136 |
| $S_{10}$ | =f FLINT OF LAST OBJECTIVE +f FLINT OF CHOSEN OCULAR LENS. |

FIG. 5.

LENS DATA

| LENS | DIA. | RADII | GLASS | CENTER THICKNESS | $N_D$ | $N_C$ | $N_F$ |
|---|---|---|---|---|---|---|---|
| $L_1, L_5, L_9, L_{13}$ | .120 | $R_1 = \infty$ $R_2 = -.600$ | FLINT | .015 | 1.649 | 1.6435 | 1.6629 |
| $L_2, L_6, L_{10}, L_{14}$ | .120 | $R_3 = +.600$ $R_4 = +.600$ | CROWN | .025 | 1.517 | 1.5146 | 1.5226 |
| $L_3, L_7, L_{11}, L_{15}$ | .120 | $R_5 = +.600$ $R_6 = +.600$ | CROWN | .025 | 1.517 | 1.5146 | 1.5226 |
| $L_4, L_8, L_{12}, L_{16}$ | .120 | $R_7 = -.600$ $R_8 = \infty$ | FLINT | .015 | 1.649 | 1.6425 | 1.6629 |

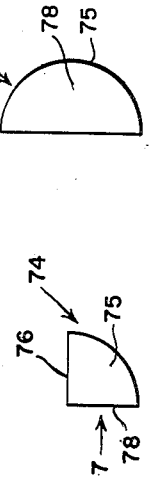

FIG. 4.

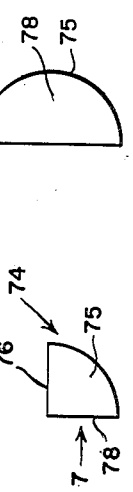

FIG. 6.

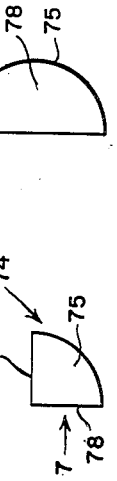

FIG. 7.

INVENTOR.
ROBERT HAMILTON PECKHAM
BY
ATTORNEYS

United States Patent Office 2,828,669
Patented Apr. 1, 1958

2,828,669

LENS SYSTEM FOR ENDOSCOPES

Robert Hamilton Peckham, Morgantown, W. Va., assignor to George P. Pilling & Son Company, Philadelphia, Pa., a corporation of Pennsylvania Application July 14, 1953, Serial No. 367,855

5 Claims. (Cl. 88—57)

This invention relates to telescopic lens systems for endoscopes, using this term in a broad sense to include various elongated instruments for viewing internal organs of the body such as bronchoscopes, gastroscopes, cystascopes, or the like.

In view of the very large ratio of length to diameter of the tubes of such instruments, their telescopic lens systems comprise an objective and an ocular with a series of intermediate lenses to transfer the image from the objective to the ocular. Heretofore, to avoid an unusually large objective lens, there has generally been accepted a collecting objective of the best practical form but having aberrations which were merely ignored as unfortunate and unavoidable. At best, attempts to correct the objectives were partial to a degree which led to a very considerably distorted view of the field. The objective was then followed by an independently designed train of alignment lenses functioning to carry the image for the length of the endoscope. The previously used alignment lenses were individually corrected to overcome the aberrations of themselves alone.

The general object of the present invention is to provide an assembly of specially designed lenses for use in an endoscope so that the spherical and chromatic aberrations of the uncorrected or partially corrected collecting objective are partially and nearly completely overcome by the assembly of the successive series of alignment lenses in the train. In accordance with the invention, the objective, the alignment lenses and the magnifying or viewing lenses form together a single corrected system such that individually, or in pairs, the lenses are not corrected, but in the whole unitary assembly they constitute a more nearly corrected system than any previously assembled system of corrected doublet lenses. This end is accomplished by computing the spherical and chromatic errors of the objective or collector system which of itself, because of its large aperture, large field and small focal length, has errors which are very great and are disturbing to the purpose of the endoscope by virtue of production of distorted, color-fringed images. The alignment lenses are then so computed that each unit provides a partial correction of the original aberrations of the objective or collecting system. Thus, in a total train of lenses, which may be formed of various numbers of pairs, each pair corrects a fraction of the initial error until the final result of approximately complete correction has been gradually accomplished. It is thus made possible to provide an endoscope which has a more nearly perfect image providing an undistorted color-corrected view of the field of examination and permitting more accurate and careful medical examination and surgical procedure than has been hitherto possible.

The image viewed by the eyepiece must be a virtual, erect, and direct one. This end is achieved if the objective or collecting lens or system has the functions of reflecting and erecting as well as providing an image from the collected rays. If an even number of lens elements is used between such objective and the eyepiece, there is no necessity for erection. If an odd number of elements is used, then erection may be secured through the use of a Dove prism.

In accordance with the invention, there is used as the objective a quadrant of a sphere subtended by two radial planes at an angle of 90°. Such an objective constitutes optically an Amici prism having entrance and exit lens surfaces.

The foregoing general objects as well as others relating particularly to details of construction will become apparent from the following description read in conjunction with the accompanying drawings, in which:

Figure 1 is a radial section through the eyepiece end of an endoscope provided with a lens system in accordance with the present invention;

Figure 2 is a similar section of the distal end thereof;

Figure 3 is a diagrammatic view showing the various elements of the improved lens system;

Figure 4 is a tabulation of lens data referring to Figure 3;

Figure 5 is a tabulation of spacer lengths also referring to Figure 3;

Figure 6 is an end view of the quadrantal objective lens as viewed in the direction indicated by the arrow 6 in Figure 7; and Figure 7 is an elevation of the objective lens viewed in the direction indicated by the arrow 7 in Figure 6.

To indicate a typical environment of the telescopic lens system constituting the present invention, there are indicated in Figures 1 and 2 the eyepiece and distal ends of an endoscope provided with a long outer tube 2 which with an external diameter of less than 0.2 inch may have a length of upwards of twenty inches. As will appear hereafter, the diameters and lengths of such tubes may vary considerably depending upon the uses of the endoscopes; but, in common there are required in such endoscopes series of lens elements for the carrying of an image from an objective to an ocular without such loss of illumination as would make viewing difficult if not impossible. Located within the tube 2 which is formed of suitable metal, there is a lens tube 4 insulated from the tube 2 by a coating 6 of insulating lacquer, though, under some circumstances, an actual separate insulating tube may be here provided. The outer tube 2 is secured by brazing or soldering in one end of a sleeve 8 which receives a tube 10 insulated from it by an insulating coating 12 or an insulating tube in the same position. An insulating member 14 is internally threaded for association with the externally threaded sleeve 8 and is, in turn, externally threaded for assembly with a conducting member 16. An externally and internally flanged insulating member 18 and a metallic spacer 20 are clamped together and against the member 16 by a nut 22 threaded upon the sleeve 8. A tubular lateral extension 24 of metal is threaded into the spacer 20 and is provided with a pin 26 providing for engagement with the bayonet slot in a conventional electrical lead assembly which is not shown. A pin 28 extends axially through the tube 24 and is insulated therefrom by passage through insulating plugs 30 and 32. The inner end of pin 28 is secured in a metallic cup 34 which provides a seat for a metallic spring 36 which serves to urge against the member 16 a flanged cylindrical metallic member 38. The flange 40 of tube 10 is clamped against the member 16 by an annular nut 42 threaded into the member 16. Threaded on the proximal end of tube 10 is an aperture-forming cup 44. Beyond this there is carried the protective glass disc 48 secured in the support 46 which is threaded into the proximal end of the member 16. An eyepiece member providing a light shield is provided at 50 externally threaded upon the member 16.

Referring now to the distal end of the instrument, there is provided what is, in effect, an extension of lens tube 4 in the form of a separate metallic tube 52, this being coupled to the tube 4 by a coupling sleeve 54. The outer tube 2 and the tube 52 are provided with aligned apertures at 56 to provide for entrance of light rays to the objective referred to hereafter. The same tubes are provided with an aperture at 58 which is covered by a transparent plastic window 60 behind which is located the illuminating lamp 62. A rounded end plug 64 is threaded into the distal end of the outer tube 2 and is provided with a socket for the reception of a spring 66 which presses a metallic button 68 against the central contact 70 of the lamp. The other contact of the lamp is provided by its peripheral flange 72 which is pressed by the action of spring 66 against the end of tube 52. The electrical circuit of the lamp may be traced from pin 26 through tube 24, spacer 20, nut 22, sleeve 8, outer tube 2, plug 64, spring 66, button 68 to contact 70 which is electrically joined in the lamp to one end of the lamp filament. The other end of the lamp filament is electrically joined to flange 72 which completes the circuit through tube 52, coupling 54, lens tube 4, tube 10, member 16, member 38, spring 36, cup 34 and pin 28. All of these elements are metallic and, consequently, a circuit is provided between pins 26 and 28 which are respectively connected to the terminals of a flexible electrical lead. The arrangement just described for providing current to the lamp 62 constitutes the invention of Elvin E. Baker disclosed and claimed in his application Serial No. 365,581, filed July 2, 1953, now Patent No. 2,779,327, dated January 29, 1957.

While it will become apparent that the invention is applicable to the use of various objectives, a preferred form of objective is shown in Figures 2, 6 and 7. This objective is in the form of a modified Amici prism provided by a quadrant of a refracting sphere. The nature of this objective 74 will become apparent from the drawings in which it will be observed that its optical surfaces comprise the spherical refracting quadrant 75 and the radial planes 76 and 78 which are mutually perpendicular. The plane surfaces 76 and 78 are provided with reflective coatings of chromium, aluminum, or the like, and the spherical refracting surface is preferably coated to reduce reflections. Consistent with dimensions of other lens elements hereafter described, the radius of the spherical refracting surface of the objective 74 is 0.084 inch. It is formed of crown glass having the refraction characteristics the same as the crown glass lens elements listed in Figure 4. The objective is mounted in the tube 52 by cementing it to a lens support 79 which may be of either plastic or metal.

Figure 2 shows this objective mounted with the diametral edge at an angle of 45° with respect to the axis of the lens system. When so mounted, with the center of the spherical refracting surface in the axis of the lens system, the field of view is at 90° to such axis. However, if fore-oblique or retrospective fields are desired, the objective may be correspondingly tilted.

It will be evident that the objective combines the characteristics of a lens provided by a sphere of crown glass and of an Amici prism. Such a spherical lens has, of course, major aberrations and in accordance with the invention these aberrations are compensated for and corrected by the transfer lens system.

The ocular 80 may be selected for magnification and chromatic values as required by a user, and may, accordingly, take many forms and need not be described in detail. It is conventionally illustrated as a cemented doublet.

The image transfer lens system which is specifically disclosed comprises four identical lens units, each comprising a pair of doublets, so that the entire system includes sixteen lens elements. The doublet nearest the ocular 80 is indicated in Figure 1 and comprises a double convex lens 82 and a plano-concave lens 84 separated by an air space 86. The lenses 84 and 82 shown in Figure 1 are identified in Figure 3 as lens elements $L_{16}$ and $L_{15}$, respectively. The doublets of each lens unit are arranged oppositely as indicated in Figure 3.

Considering Figures 3, 4 and 5, the details of the transfer lens system will become apparent. The lens system is shown in Figure 3 with the objective 74 at the left-hand end of the figure, the ocular 80 at the right-hand end of the figure and eight doublets positioned therebetween. The first doublet reading from the objective 74 includes lens elements $L_1$ and $L_2$ spaced apart by space $S_1$ and spaced from the objective 74 by space $S_2$. The second doublet includes lens elements $L_3$ and $L_4$ spaced apart by space $S_1$ and spaced from the lens $L_2$ by space $S_3$. Similar notations are applied to the other six doublets. Figure 4 is a tabulation of lens data referring to the sixteen lens of the eight doublets by the notations employed in Figure 3. As will be evident from the tabulation in Figure 4, the eight doublets are identical and the sixteen lens elements thereof have the diameter, the radii, thicknesses and indices of refraction there tabulated. The plano-concave elements are of flint glass and the double convex elements are of crown glass. Spacings of the lens elements are maintained by spacers 88, 90 and 92 of lengths particularly specified in Figure 5 which is a tabulation of the lens spaces referring to the spaces by the notations employed in Figure 3. Between the elements of each doublet there is a spacing of 0.005 inch. The spacings between the doublets, and the spacing between the distal doublet and the objective are as tabulated. The spacing between the ocular and the nearest doublet depends upon the focal length of the flint of the chosen ocular lens and is as indicated in the tabulation.

With the particular lens system indicated in the drawings and described above, complete correction is achieved through the portion of the system including the objective 74 and the transfer lenses. Furthermore, in view of the even number of units, each consisting of a pair of doublets, in the transfer lens system, the image viewed by the eyepiece is virtual, erect and direct. The various lens units are not in themselves corrected for spherical and chromatic errors, but have, in themselves, such errors as will compensate for the very considerable spherical and chromatic errors of the objective. The latter aberrations are, accordingly, compensated for step by step through the transfer lens system to give the desired fully corrected virtual image viewed by the ocular.

If the data which is given is analyzed, it will be found that this step by step correction is achieved. In certain cases, however, the requirements of diameter of the outer tube of the endoscope and the length of the tube may require a different number of lens units. If a lesser number of transfer lens units is required, then each of them is designed, in accordance with the invention, to provide a greater degree of correction than each of the units heretofore specified. On the other hand, if a greater number of units is required, the correction per unit may be made correspondingly less. Furthermore, it will be evident that an incompletely corrected ocular may be utilized as part of the system to achieve final correction which has not been completely attained through the transfer lens system. It will be understood that the invention is concerned with the step by step or gradual correction of substantial aberrations of the objective or collector lens, without there being made an attempt to secure such correction in the objective itself. Attempts at the latter have several shortcomings. First, it is practically impossible to secure any high degree of correction in an objective having suitable dimensions for endoscopic use. Secondly, such a corrected objective involves substantial loss of illumination. A third practical aspect to the situation is that for attainment of different angles of view, either different objectives must be used or different prisms must be used. In accordance with the invention, a very simple single element objective is provided which, furthermore, has the great advantage that it may be used to provide different angles of view merely by variation of its setting in the instrument. Such a simple objective, though having large spherical and chromatic aberrations, may be utilized because of the corrections afforded, as described above, through the transfer lens system.

Mention has heretofore been made of the fact that the required virtual, erect and direct image viewed by the ocular is achieved only if an even number of lens units is used in the transfer system. In the event that an odd number is used, erection may be attained by the use of a Dove prism such as illustrated at 94 in Figure 1, such a prism being absent if an even number of lens units is provided. The Dove prism is, of course, set in the proper angular position to provide a virtual, erect and direct image when it is used.

It is to be understood that the specific data given herein is not to be regarded as limiting the invention, inasmuch as in accordance with the teachings herein, the required corrections may be secured with other numbers of lens elements the characteristics of which may be calculated in accordance with known mathematical procedures in this art. It is also to be understood that the lens groups need not be identical, in the fashion specifically described, though, of course, this is advantageous from the standpoint of reducing the cost of manufacture by the utilization of duplicate elements.

What is claimed is:

1. A lens system for an endoscope comprising, in combination with lens mounting means an objective, an ocular and a multiunit transfer lens system optically aligned between said objective and ocular and the units of the multiunit lens system being spaced apart on the optical axis, said objective being of a type having substantial aberrations, and said transfer lens system having uncorrected lens units, each comprising a pair of oppositely facing lens doublets, and each of which compensates, in part, the aberrations of said objective, each of said doublets consisting of a double convex lens and a plano-concave lens separated by an air space.

2. A lens system for an endoscope comprising, in combination with lens mounting means, an objective, an ocular, and a multiunit transfer lens system optically aligned between said objective and ocular and the units of the multiunit lens system being spaced apart on the optical axis, said objective being of a type having substantial aberrations, and said tranfer lens system having uncorrected lens units, each comprising a pair of oppositely facing lens doublets, and each of which compensates, in part, the aberrations of said objective, each of said doublets consisting of a double convex lens and a plano-concave lens separated by an air space, all of said doublets being the same.

3. A lens system for an endoscope comprising, in combination with lens mounting means, an objective, an ocular, and a multiunit transfer lens system optically aligned between said objective and ocular and the units of the multiunit lens system being spaced apart on the optical axis, said objective being in the form of a quadrant of a refracting sphere bounded by reflective mutually perpendicular radial planes and positioned in the lens system with the diameter of intersection of said radial planes located at an acute angle with the optical axis of the lens system, and said transfer lens system being of a type compensating substantially the aberrations of said objective.

4. A lens system for an endoscope comprising, in combination with lens mounting means, an objective, an ocular, and a multiunit transfer lens system optically aligned between said objective and ocular and the units of the multiunit lens system being spaced apart on the optical axis, said objective being in the form of a quadrant of a refracting sphere bounded by reflective mutually perpendicular radial planes and positioned in the lens system with the diameter of intersection of said radial planes located at an acute angle with the optical axis of the lens system, and said transfer lens system having uncorrected lens units each of which compensates, in part, the aberrations of said objective.

5. A lens system for an endoscope comprising, in combination with lens mounting means, an objective, an ocular, and a multiunit transfer lens system optically aligned between said objective and ocular and the units of the multiunit lens system being spaced apart on the optical axis, said objective being in the form of a quadrant of a refracting sphere bounded by reflective mutually perpendicular radial planes and positioned in the lens system with the diameter of intersection of said radial planes located at an acute angle with the optical axis of the lens system, and said transfer lens system having uncorrected lens units each of which compensates, in part, the aberrations of said objective to provide a substantially fully corrected virtual image for observation by said ocular.

References Cited in the file of this patent

UNITED STATES PATENTS

| | | |
|---|---|---|
| 984,929 | Kellner | Feb. 21, 1911 |
| 1,006,699 | Straubel | Oct. 24, 1911 |
| 1,584,272 | Bertele | May 11, 1926 |
| 1,706,930 | Loeck | Mar. 26, 1929 |
| 1,741,575 | Leiter | Dec. 31, 1929 |
| 1,863,099 | Bowen | June 14, 1932 |
| 1,975,302 | Van Albada | Oct. 2, 1934 |
| 2,519,760 | Hett | Aug. 22, 1950 |
| 2,698,555 | McCarthy | Jan. 4, 1955 |